United States Patent [19]

Skibitzke et al.

[11] Patent Number: 5,454,662
[45] Date of Patent: Oct. 3, 1995

[54] CONNECTOR FOR COUPLING THE PIPES OF A PIPE CORRAL

[75] Inventors: Edward P. Skibitzke, Pacific Palisades; David Boyd, Malibu, both of Calif.

[73] Assignee: Animal Enclosure Systems, Pacific Palisades, Calif.

[21] Appl. No.: 156,582

[22] Filed: Nov. 23, 1993

[51] Int. Cl.⁶ .............................. F04H 17/14; F16B 7/04
[52] U.S. Cl. ........................... 403/396; 403/400; 403/27; 256/69; 256/68; 24/598.2
[58] Field of Search ..................... 256/65, 68, 69; 403/396, 400, 498, 27; 70/456 R; 24/598.3, 598.2, 598.8; 411/400, 383, 384; 285/93

[56] References Cited

U.S. PATENT DOCUMENTS

| | | | |
|---|---|---|---|
| 310,301 | 1/1885 | Miller | 24/598.3 X |
| 765,823 | 7/1904 | Erb | 70/456 R X |
| 2,029,798 | 2/1936 | Schellin | 285/93 |
| 2,244,790 | 6/1941 | Maier | 403/396 |
| 3,520,564 | 7/1970 | Peterson | 403/396 |
| 3,550,244 | 12/1970 | Villo et al. | 403/27 |
| 4,037,788 | 7/1977 | Riley | 256/65 |

FOREIGN PATENT DOCUMENTS

| | | | |
|---|---|---|---|
| 668347 | 11/1937 | Germany | 403/396 |
| 417366 | 1/1947 | Italy | 403/396 |

*Primary Examiner*—Anthony Knight
*Attorney, Agent, or Firm*—Spensley Horn Jubas & Lubitz

[57] ABSTRACT

A pipe corral connector consisting of a pair of bolts having corresponding hingedly coupled first ends, and second, threaded ends. The second end of one of the bolts is provided with a right hand thread while the second end of the other bolt is provided with a left hand thread. The threaded ends of the bolts are brought together with a nut that is internally threaded halfway with a right hand thread and halfway with a left hand thread. The nut provides a turnbuckle-like effect in bringing the two bolts together and tightly joining intersecting or parallel pipes of a pipe corral. The connector eliminates all sharp edges which might otherwise injure a corralled horse. The inside surface of the connector bolts may be serrated or notched to provide increased friction at the point of pipe connection. The nut and one of the bolts may be marked to identify matching thread sense to facilitate determination of the correct orientation of the nut.

16 Claims, 4 Drawing Sheets

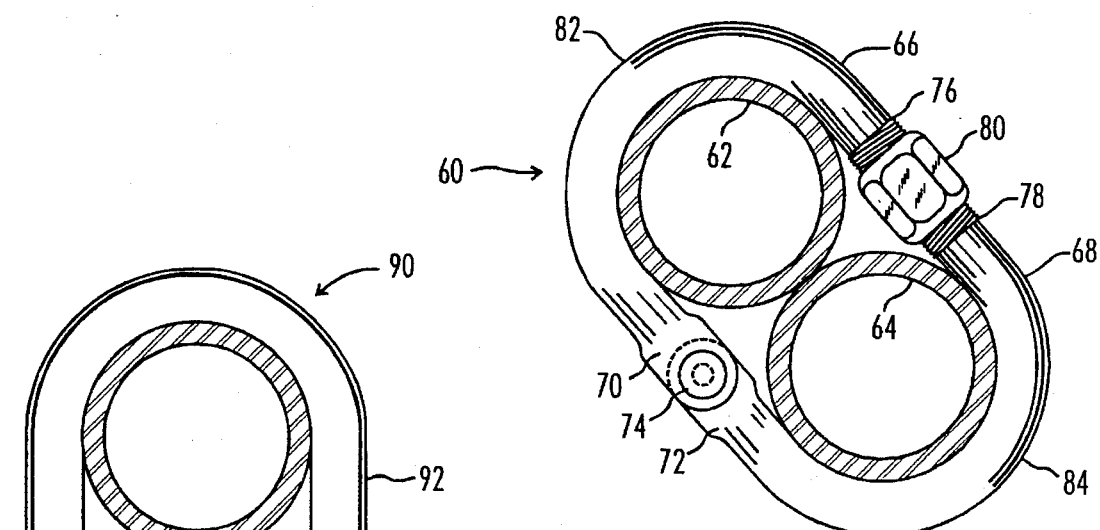
FIG. 4
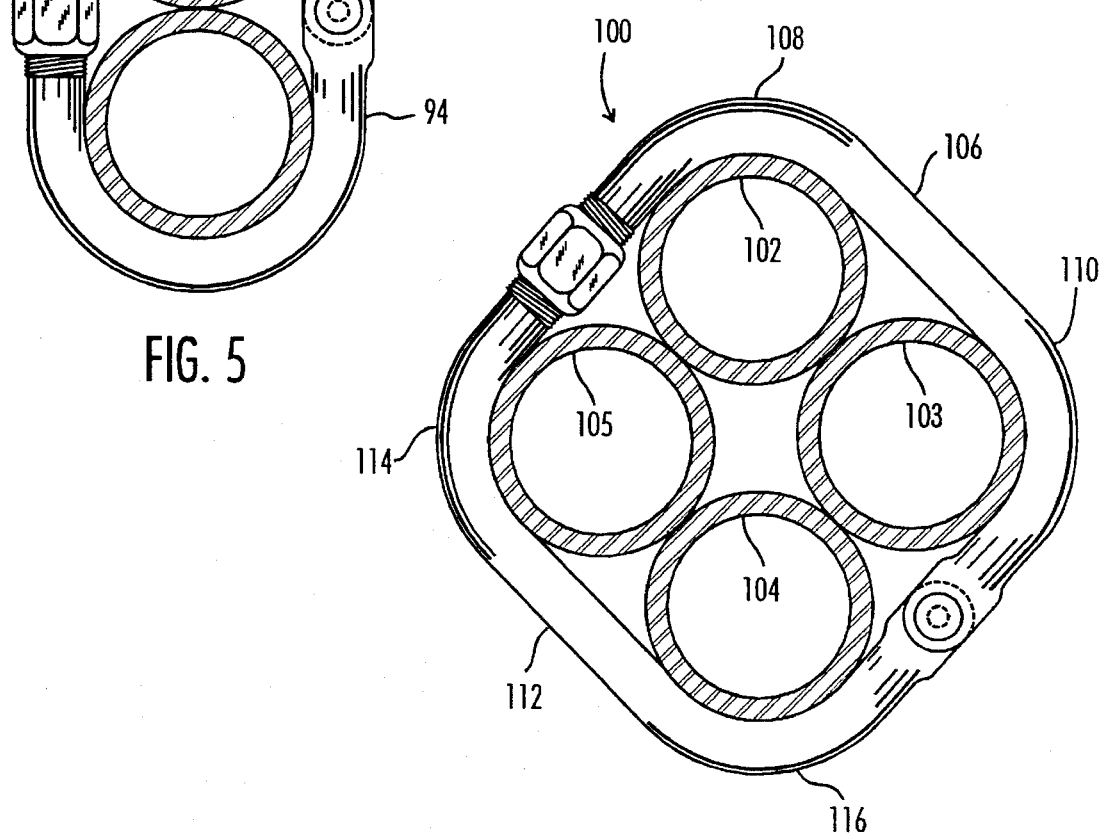
FIG. 5
FIG. 6

5,454,662

CONNECTOR FOR COUPLING THE PIPES OF A PIPE CORRAL

FIELD OF THE INVENTION

The present invention relates generally to fasteners and particularly to pipe corral connectors for coupling crossed or parallel pipes used in corral structures.

DESCRIPTION OF THE PRIOR ART

Existing pipe corral fasteners for connecting crossed or parallel corral pipes comprise assemblies consisting of standard U-bolts with round ends and cross bars spanning the legs of the U-bolt. Parallel corral pipes are presently connected with various other types of metal parts held together with nuts and bolts whose sharp or pointed edges tend to protrude outward beyond the face of the connector. As is well known, the ends of the U-bolt legs are threaded for receiving nuts which, when tightened, clamp together the pipes passing through the confines of the U-bolt. Such fasteners are used for securing corral gates and for attaching pipe frame accessories such as sun shades to existing corral pipe structures. For strength, the cross bars of presently used U-bolts are typically made of lengths of channel. The sharp, projecting threaded bolt ends as well as the sharp, channel extremities, however, pose a risk of injury to both horses and corral personnel. Further, because the cross bar is essentially a straight element that does not conform to the curvature of the pipes being clamped, the resulting connection is often not secure; on the other hand, excessive tightening of the cross bar can bend it or deform the pipe sections being clamped.

SUMMARY OF THE INVENTION

The present invention addresses the foregoing problems by providing a two-part, hinged pipe corral connector, the parts having oppositely threaded ends which are in opposed relationship when the hinged connector is in the closed configuration. Each part of the connector comprises a bolt having at least one curved section whose curvature conforms approximately to the curvature of the pipes being connected. A nut having oppositely threaded sections is received by the threaded ends of the pipe connector. Tightening of the nut draws the ends of the connector parts together within the confines of the nut. In this fashion, the threaded ends are contained within the confines of the nut and therefore they are not exposed to the elements and do not present a hazard to horses or corral personnel. Further, only a single nut is required in contrast with the double nut U-bolt assemblies in present use.

The corral pipe connector of the present invention may be used to fasten crossed pipes or parallel pipes and the configuration of the connector can be varied to accommodate two, three, or more pipes.

To facilitate the application of the nut to the threaded ends of the connector bolt parts, one face of the nut may be marked, by color or other indicia, to match up with like indicia on one of the bolts so that, for example, the right hand threaded section of the nut can be matched to the right hand threaded connector bolt.

In using the connector, the nut may first be screwed onto the bolt having the right hand thread, for example, for one or two turns. The connector is then closed bringing the left hand threaded end of the other bolt into contact with the nut. The nut rotational direction is then reversed until a click is felt and/or heard and then the right hand rotational direction of the nut is then resumed causing the threaded ends of the opposed parts of the connector to enter the nut at the same starting point for both bolt ends.

The nut can be provided with a round-edged, hex configuration or can be furnished with a cylindrical, outer knurled surface which can be wrenched or hand-tightened. Serrations or notches can further be provided on the inner surfaces of the opposed connector bolt parts to increase friction between the connector and the pipes being fastened to help prevent the pipes from moving apart at the joint. The entire assembly is preferably provided with a galvanized or otherwise corrosion resistant surface finish.

The hinge in its simplest and preferred form may simply be a rivet pin extending through aligned holes in the corresponding ends of the connector bolts so that the connector parts can be easily rotated relative to each other but cannot be separated.

BRIEF DESCRIPTION OF THE DRAWINGS

Further objects, features and advantages of the invention will become evident from the detailed description which follows when taken in conjunction with the accompanying drawings in which:

FIGS. 4, 5, 6 and 7 show alternative embodiments of the present invention.

DETAILED DESCRIPTION OF THE PREFERRED EMBODIMENTS

Figure 1:
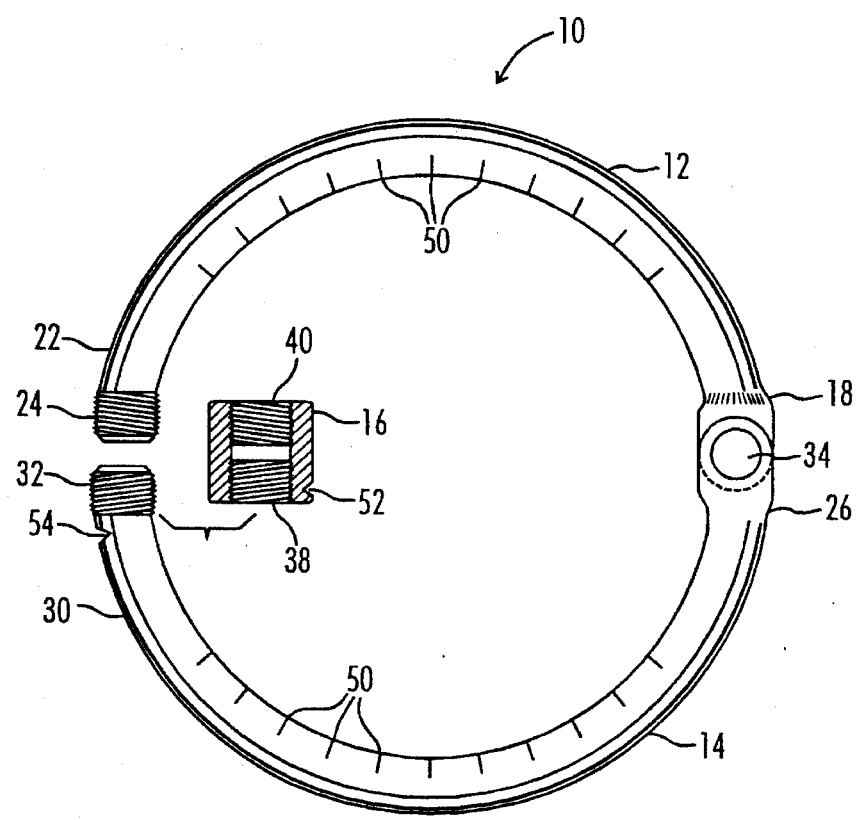
FIG. 1 is a plan view of a pipe corral connector in accordance with a first embodiment of the present invention.

With reference to FIG. 1 of the drawings, there is shown a first embodiment 10 of the pipe corral connector of the invention comprising a first, curved bolt 12, a second curved bolt 14 and a nut 16. By way of example, the bolts may be formed of ⅜-inch diameter stock. The bolt 12 has a first end 18 that is flattened and provided with a hole 20 extending generally perpendicular to the plane of the semi-circular bolt 12. The bolt 12 further has a second end 22 that has a thread 24 of a first sense, for example, left hand. The second bolt 14, like the first bolt 12, has a first end 26 that is flattened and provided with a hole 28 in alignment with the hole 20 in the first end of the bolt 12. The second bolt 14 has a second end 30 threaded in a sense opposite to that of the threads 24 of the first bolt. Thus, if the threads 24 of the first bolt 12 is a left hand thread, the end 30 of the second bolt 14 will be provided with a right hand thread 32. Coupling the first and second bolts at their first ends 18 and 26 is a rivet hinge pin 34 extending through the aligned holes 20 and 28. It will thus be seen that the bolts 12 and 14 of the corral pipe connector 10 may be pivoted about the rivet hinge pin between open and closed positions, with the threaded ends 24 and 32 being opposite each other and in alignment in the closed configuration of the connector, as seen in FIG. 1.

Figure 3:
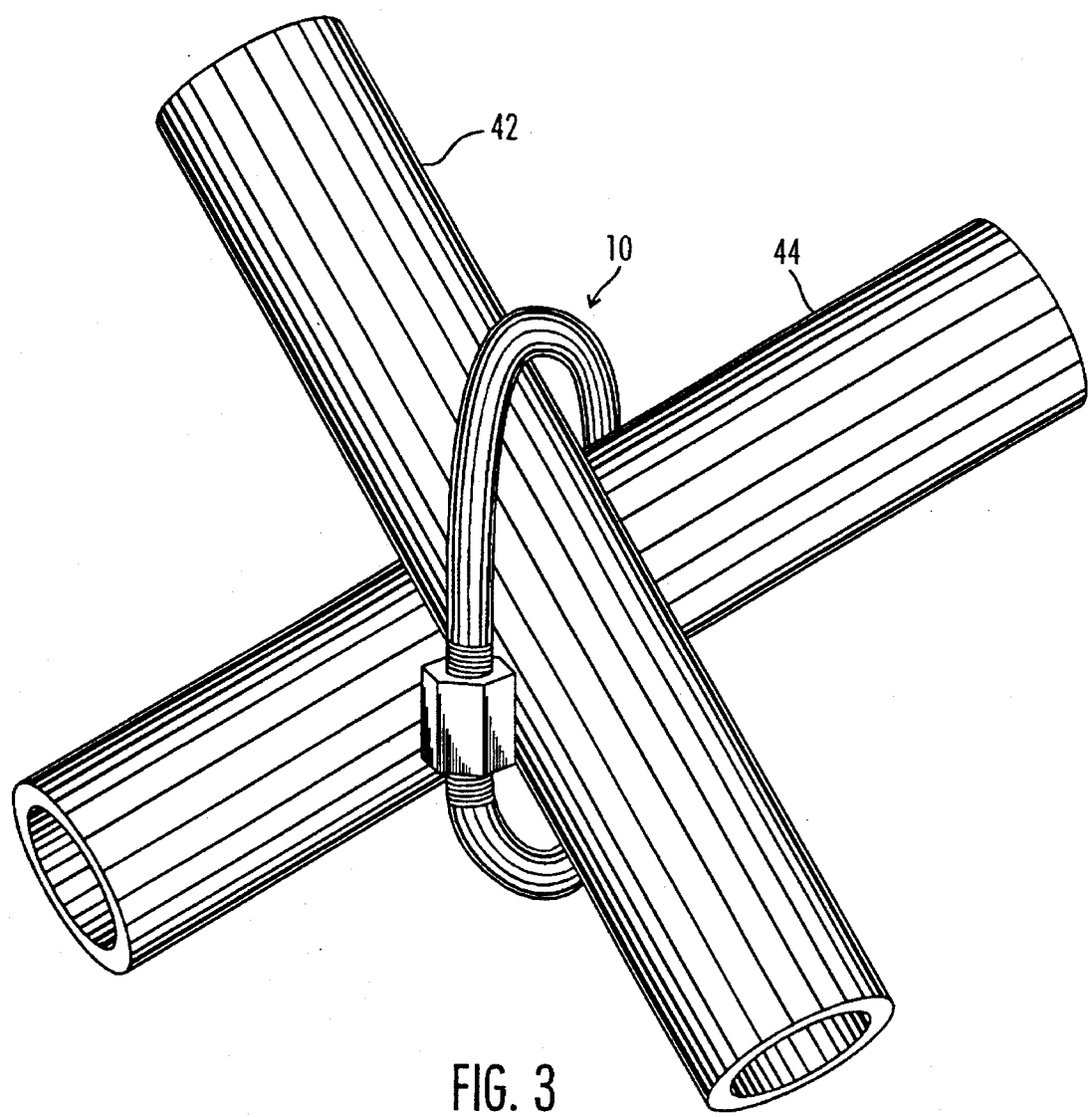
FIG. 3 is a perspective view of a pipe connector in accordance with the invention shown in its operative configuration for connecting a pair of crossed corral pipes.

The nut 16 is internally threaded halfway from one of its faces with a right hand thread 38 and halfway from the other opposed face with a left hand thread 40. When applied to the opposed, threaded ends 24 and 32 of the bolts, the nut 16 provides a turnbuckle-like effect in bringing the bolts together and tightly joining the vertical and/or horizontal pipes of a pipe corral. The bolts, as they come together, are securely coupled and drawn into a closed position by the above-mentioned right and left hand threaded nut 16. Accordingly, the connector 10 may be placed around parallel or crossed pipes of a pipe corral to provide a secure closure for a gate or as a clamp or connector for coupling various pipe structures such as a sun shade to the pipe corral structure. FIG. 3 shows the connector 10 coupling a pair of crossed corral pipes 44 and 46 at their intersection.

Besides connecting the various elements of pipe corral horse enclosures, the present connector eliminates sharp edges found in present pipe corral connection systems as well as providing a quick way to assemble pipe corral structures. Because of the delicate nature of a horse's skin and a horse's propensity to rub against any exposed part of its corral enclosure, it can be easily injured in its corral if exposed sharp edges are present. The present invention completely eliminates such exposed edges. Sharp edges are further eliminated in the connector of the present invention by the following: (a) All bolt material has rounded surfaces except where it has been stamped into a flattened configuration for hinging. At this point, however, the hinge connection point has been stamped into a rounded form. (b) The sharp edges of the connection nut 16 are all rounded off. (c) The connection bolts 12 and 14 are designed so that at the completion of tightening no bolt end protrudes which would provide a potentially sharp edge.

Moreover, the speed of installation of the pipe connector of the present invention is enhanced by the following: (a) only one nut 16 is used for connection instead of the two nuts found on the presently used U-bolt connectors; (b) the connection nut 16 has internal right and left hand threads bringing the two bolts of the connector together twice as fast as the conventional nut and bolt combination; and (c) the curved configuration of the bolts in the open position allow the installer to easily hook together the pipes to be connected before the nut is threaded into place. This allows for a one-person operation in contrast to the presently existing connection system which often requires two persons per connection, one to hold the pipes in position and one to install the connector bolts and nuts.

As shown in FIG. 1, the inside surfaces of the connector bolts 12 and 14 may be provided with notches or serration 50 to increase the friction at the point of pipe connection thus minimizing the relative movement of the pipes at the connection point. Moreover, one end of the nut 16 and the corresponding bolt 14 may be marked in various ways, for example, with notches 52 and 54 (FIG. 1) to identify a matching thread sense, for example, the right hand thread. Color coding can be used as an alternative.

FIGS. 4–7 show alternative embodiments of the corral pipe connector of the invention for coupling two to four parallel corral pipes. FIG. 4 shows a connector 60 for coupling two corral pipes 62 and 64. This connector includes a pair of generally U-shaped bolts 66 and 68 having corresponding first, flattened ends 70 and 72 coupled with a rivet hinge pin 74 and second, oppositely threaded ends 76 and 78 joined by a correspondingly oppositely threaded nut 80. Each bolt has a curved section 82, 84 whose curvature generally matches that of the curvature of the corral pipe being coupled.

FIG. 5 shows a three pipe connector 90 comprising U-shaped bolts 92 and 94. This embodiment is similar to that of FIG. 4 except that one of the bolts 92 is longer than the other bolt 94.

The embodiment of FIG. 6 comprises a connector 100 having a generally square configuration with rounded corners for joining four parallel pipes 102–105. Thus, the connector 100 comprises a first bolt 106 having curved sections 108 and 110 and a second bolt 112 hingedly coupled to the first having curved sections 114 and 116.

Figure 2:
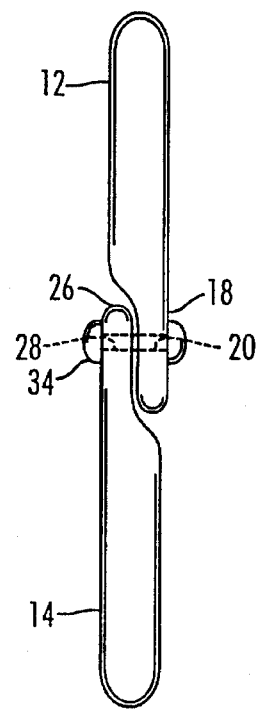
FIG. 2 is an end elevation view of the pipe connector of FIG. 1.
Figure 7:
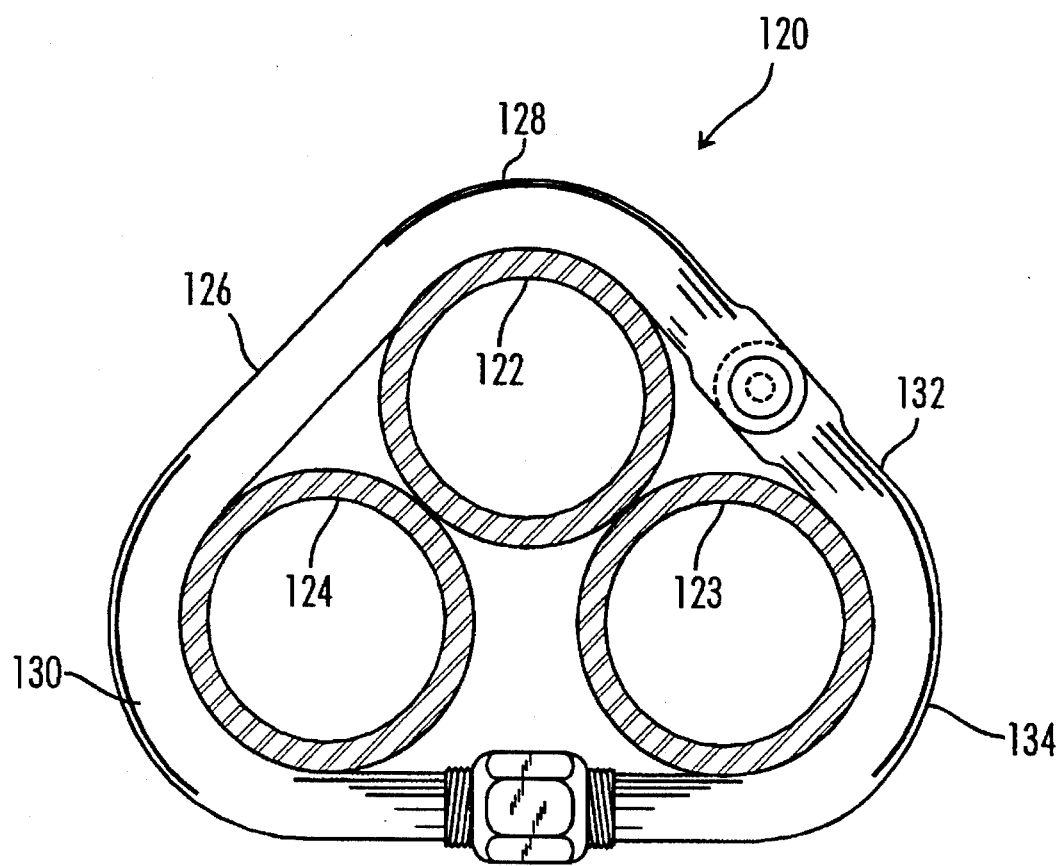

FIG. 7 comprises a connector 120 in accordance with another embodiment of the invention having a generally triangular configuration with rounded corners for joining a triangular array of parallel corral pipes 122–124. The connector 120 includes a first bolt 126 having two curved sections 128 and 130 and a second bolt 132 having a single curved section 134. In all of the alternative embodiments of FIGS. 4–7, the threaded ends of the bolts, the oppositely threaded nut and the hinged ends are identical to those described in connection with the first embodiment of FIGS. 1–3.

The foregoing description and the accompanying drawings are merely illustrative of the application of the principles of the present invention and are not to be construed as limiting. Numerous other equivalent arrangements which employ the principles of the invention and which fall within its spirit and scope may be readily devised by those skilled in the art. Accordingly, the invention is not limited by the foregoing detailed description and accompanying drawings but is only limited by the scope of the appended claims.

What is claimed is:

1. A connector for coupling two or more pipes of a pipe corral structure, the connector comprising:

a pair of connector bolts, each bolt having at least one curved section configured to generally conform to the curvature of a corral pipe, a first end, and a second end, the first end of one of said bolts being hingedly coupled to the first end of the other of said bolts and the second end of said one bolt having a right hand thread and the second end of said other bolt having a left hand thread; and an internally threaded nut, said internal thread comprising left hand and right hand sections adapted to be received by the matching threads of the connector bolts, the nut and one of the bolts being marked to indicate a matching thread sense.

2. A connector, as defined in claim 1, in which the hinge includes a rivet pin extending through aligned holes in the first ends of the bolts.

3. A connector, as defined in claim 1, in which:

the pair of connector bolts are generally coplanar, said bolts being hingedly coupled along an axis substantially perpendicular to the plane of the connector bolts.

4. A connector, as defined in claim 1, in which:

each of said pair of connector bolts has a generally semi-circular configuration.

5. A connector, as defined in claim 1, in which:

each of said pair of connector bolts has a generally U-shaped configuration.

6. A connector, as defined in claim 5, in which:

said pair of connector bolts, when joined by said threaded nut, together form a generally square configuration.

7. A connector, as defined in claim 1, in which:

the pair of connector bolts, when joined by said threaded nut, together form a generally triangular configuration.

8. A connector, as defined in claim 1, in which the curved sections of the bolts are provided with serrations to increase the friction between the bolts and the pipes being connected.

9. A connector for coupling two or more pipes of a pipe corral structure, the connector comprising:

a pair of connector bolts, each bolt having at least one curved section configured to generally conform to the curvature of a corral pipe, a first end, and a second end, the first end of one of said bolts being hingedly coupled to the first end of the other of said bolts and the second end of said one bolt having a right hand thread and the second end of said other bolt having a left hand thread, the curved sections of the bolts being provided with serrations to increase the friction between the bolts and the pipes being connected; and an internally threaded nut, said internal thread comprising left hand and right hand sections adapted to be received by the matching threads of the connector bolts.

10. A connector, as defined in claim 9, in which the hinge includes a rivet pin extending through aligned holes in the first ends of the bolts.

11. A connector, as defined in claim 9, in which:

the pair of connector bolts are generally coplanar, said bolts being hingedly coupled along an axis substantially perpendicular to the plane of the connector bolts.

12. A connector, as defined in claim 9, in which:

each of said pair of connector bolts has a generally semi-circular configuration.

13. A connector, as defined in claim 9, in which:

each of said pair of connector bolts has a generally U-shaped configuration.

14. A connector, as defined in claim 13, in which:

said pair of connector bolts, when joined by said threaded nut, together form a generally square configuration.

15. A connector, as defined in claim 9, in which:

the pair of connector bolts, when joined by said threaded nut, together form a generally triangular configuration.

16. A connector, as defined in claim 9, in which the nut and one of the bolts are marked to indicate a matching thread sense.

* * * * *